Aug. 8, 1944.  W. J. CARTER  2,355,420
PRESS
Filed June 16, 1939  3 Sheets-Sheet 1

INVENTOR.
WILLIAM J. CARTER
BY Bates, Golrick & Teare
ATTORNEYS

Patented Aug. 8, 1944

2,355,420

UNITED STATES PATENT OFFICE 2,355,420

PRESS

William J. Carter, Akron, Ohio, assignor, by mesne assignments, to Akron Standard Mold Company, Akron, Ohio, a corporation of Ohio Application June 16, 1939, Serial No. 279,478

7 Claims. (Cl. 18—17)

This invention relates to a vulcanizing press for molded articles and has for its object the provision of a new method for breaking the vulcanizing mold in such a manner that the vulcanized article is automatically stripped from the respective mold sections.

In the manufacture of rubber tires, it has heretofore been the practice to vulcanize a raw carcass for a tire between cooperating mold sections mounted for operation in a suitable press. The tire thereafter was stripped from the mold by some mechanical arrangement projecting into one of the sections, to thereby push or otherwise pry the finished tire from the mold. This method of removal is sometimes objectionable, as the tire may stick to one or either of the mold sections, thereby rendering its removal very difficult, and causing considerable delay in the operation of the press.

My present invention is directed to a new method of removal which obviates the difficulties heretofore experienced. I have found that it is better practice to break the tires directly from the mold sections upon opening of the press, rather than employ some mechanical stripping arrangement after the mold has been opened. To this end, I have found that by slightly raising one of the mold sections while its cooperating section is laterally rotated about a pivot, a slight rotational twist is produced on the tire, which will simultaneously strip it from contact with both of the mold sections. Continued opening of the press will thereafter facilitate removal of the tire.

Figure 1:
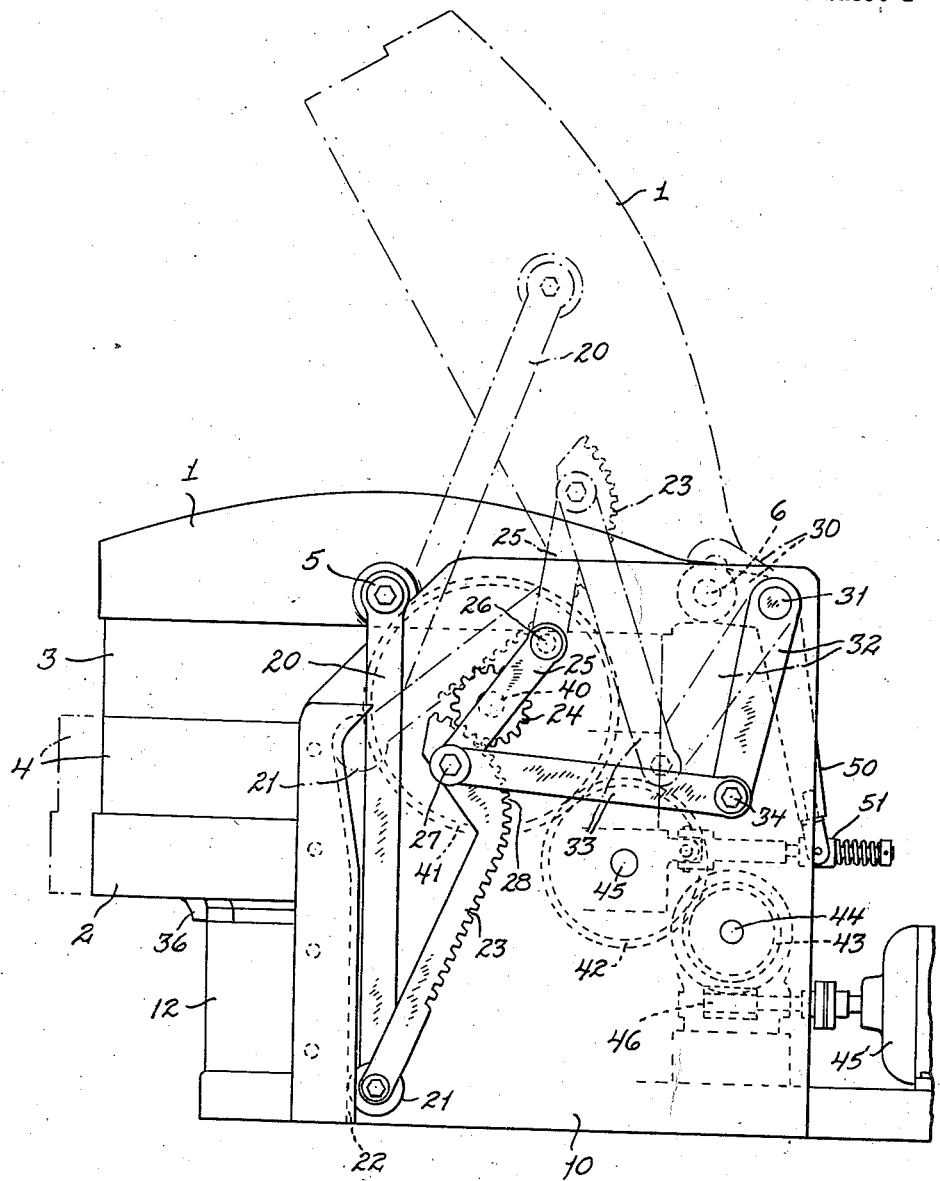
Figure 2:
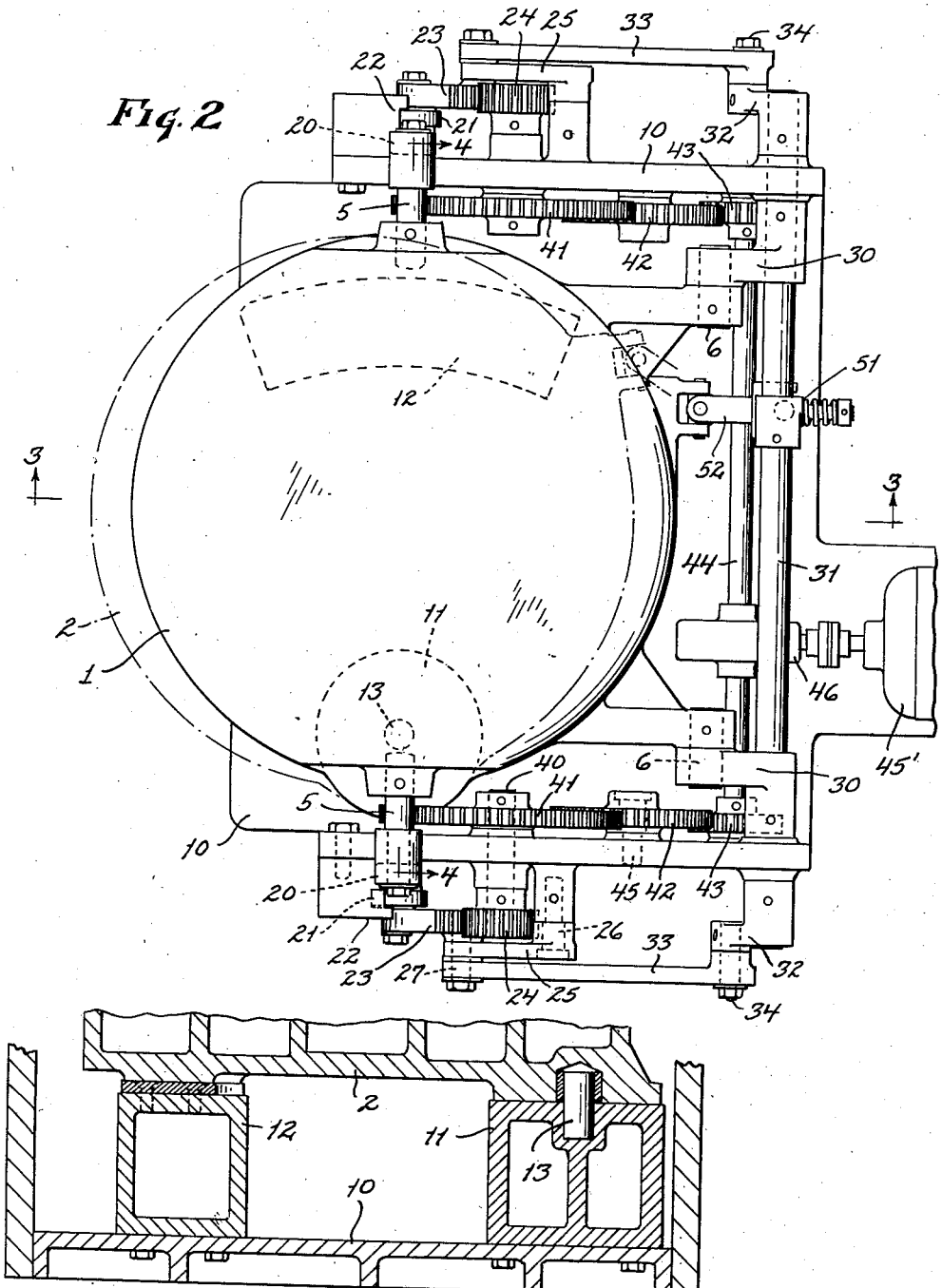
Figure 3:
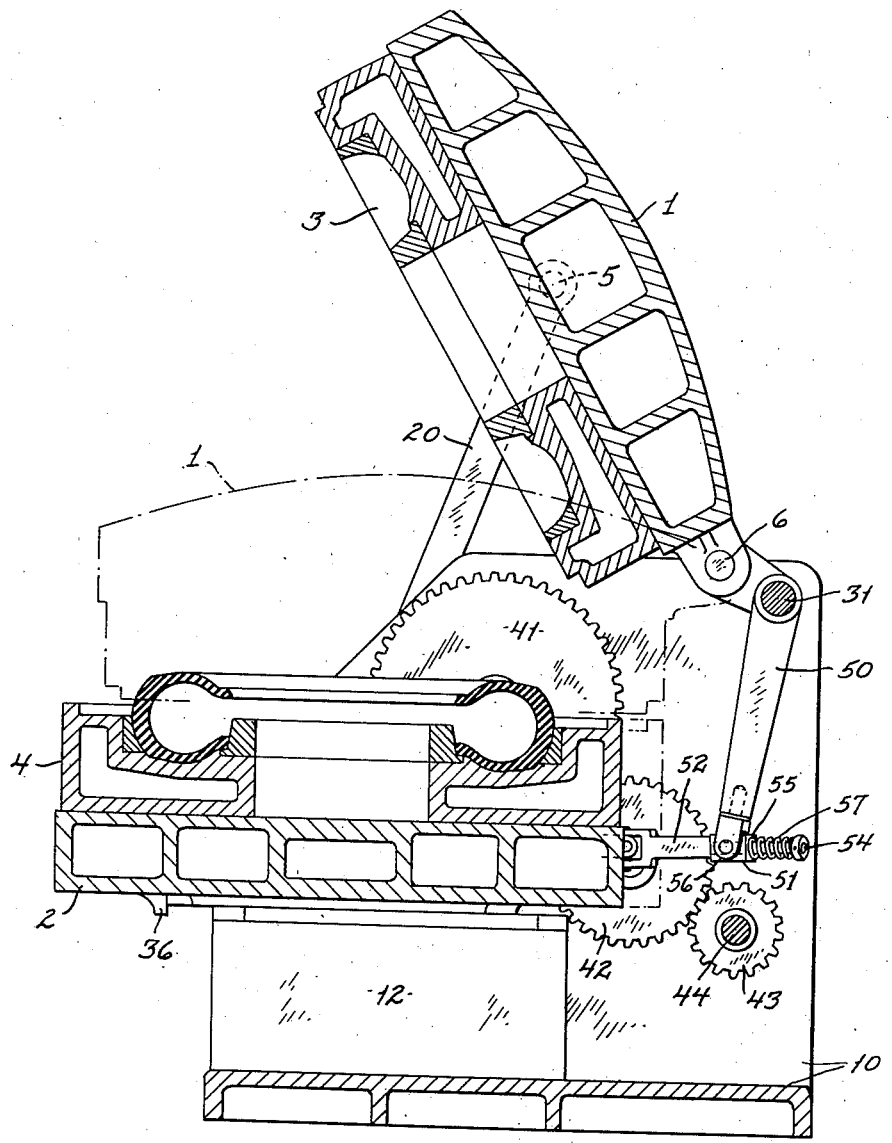

Referring now to the drawings, Fig. 1 is a side elevation of a vulcanizing press embodying my invention; Fig. 2 is a top elevation of the same press; Fig. 3 is a transverse section, taken substantially along the line 3—3 of Fig. 2, illustrating the press in opened position and Fig. 4 is a transverse section taken substantially along the lines 4—4 of Fig. 2.

My invention may be embodied in any suitable vulcanizing press, having relatively movable mold sections. In Fig. 1, I have preferably shown a press having an upper molding head 1, a lower head 2, and cooperating mold sections 3 and 4 attached to the respective heads. The upper head is preferably supported by a pair of trunnions 5 and pivotal supports 6, for movement in a vertical direction to open the mold. The lower head is supported by the frame 10 upon a pair of tables 11 and 12, for rotational movement about a pivotal connection 13 as illustrated in Figs. 2 and 4, respectively. Thus, it will be seen that by lifting the upper head in a substantially vertical direction and rotating the lower head laterally, an effective twist is produced on the tire which will simultaneously break it from contact with the inner surfaces of both mold sections.

The upper molding head may be opened and closed by a pair of push bars 20 connected on opposite sides of the press to the trunnions 5. The lower ends of the push bars are each guided by a cam roller 21 acting in a substantially vertical cam slot 22 carried on the respective sides of the frame.

The push bars are preferably operated by suitable toggle mechanism, one link of which comprises a toothed rack 23, in meshing engagement with a pinion 24. The rack 23 is held in engagement with the pinion 24 by means of a second link 25, rotatable about a stationary pivot 26 carried by the frame, for attachment to a movable pivot 27 carried at one end of the rack. The rack 23 is also provided with an arcuate portion 28 to produce a secondary toggle effect on the push bar 20 at the end of its downward movement to thereby lock the mold sections during the vulcanizing operation.

The upper press head is also hinged upon movable pivots 6 for movement about the radius of a pair of crank arms 30 which are carried by an equalizing shaft 31, extending longitudinally of the press. The shaft 31 is actuated on opposite sides of the press by a pair of links 32 and 33, joined by a pivotal connection at 34 and attaching to the movable pivot 27 on the arm 23. It may therefore be seen that by rotating the pinion 24 in a clockwise direction, as illustrated in Fig. 1, the link 25 is rotated about the stationary pivot 26 which causes a slight lift of the push bar 20 at the same time exerting a pull on the link 33 to rotate the equalizing shaft 31 and thereby raise the hinge connection 6 for the upper press head in proportion to the upward travel of the push bars 20. The upper head is thus initially raised in a vertical direction in substantially its own plane after which the travel of the push bar 20 tilts the head about the hinge 6 to open the press to a position shown in broken lines in Fig. 1 or in sectional view in Fig. 3.

The drive pinions 24 on opposite sides of the press may be driven by an intermediate shaft 40 through suitable gearing 41, 42 and 43 from an equalizing power shaft 44 journalled in the frame. The gear 42 is carried by the frame upon a stationary spindle 45 while the power shaft 44 may be rotated in either direction by an electric motor 45', coupled to the shaft through a speed reduction unit 46.

The lower mold head may be supported on the frame by a pair of supporting tables 11 and 12 disposed on opposite sides of the frame as illustrated in Fig. 4; the arrangement being such that the head may slide laterally upon the table 12 for oscillating movement about a stationary pivot 13 carried by the table 11. A stop 36 may be positioned on the bottom side of the head to limit the inward movement of the same and thereby to maintain the respective mold sections in registration.

The lower mold head preferably receives its lateral movement from the equalizing shaft 31 by an arm 50 acting through a lost motion linkage 51, pivotally connected to the head for universal movement with respect to the arm. The lost motion linkage 51 may comprise an arm 52 having a reduced portion 54 adapted to receive a sleeve 55, for pivotal attachment to the bifurcated end 56 of the arm 50. A yieldable spring 57 may be attached to the extremity of the extension 54 to exert a yieldable pressure against the movement of the arm 50.

During the process of vulcanizing, the press remains in a closed position, as is illustrated in Fig. 1 and is locked by the arcuate portion 28 of the rack 23, as heretofore described. To open the press, the pinion 24 is rotated in a clockwise direction by the motor 45. This causes the push bars 20 to raise the upper head slightly in its own plane, in a substantially vertical direction. The movement of the shaft 31 is sufficient to take up any predetermined amount of lost motion in the linkage 51 which thereafter pushes the lower mold section outwardly, for lateral movement about the pivot 13. As the upper mold section 3 continues to rise, as heretofore described, the combined lateral and vertical movement of the respective mold sections imparts a twist to the tire and breaks it from the mold, whereupon removal is thereafter facilitated by further upward movement of the push bars 20 which operate to throw the upper head back about its hinge 6.

While I have illustrated and described one form of mechanism for so operating the mold sections as to twist the tire and thereby break it automatically from the mold, it is to be understood that other forms of mechanism for accomplishing the same result are within the scope of my invention as set forth in the appended claims.

It is therefore apparent, from the foregoing description, that I have invented a new and useful apparatus for automatically stripping molded articles from a vulcanizing press upon relative movement of the respective mold sections, and independently of other mechanical stripping arrangements which have heretofore been used.

I claim:

1. A vulcanizing press comprising in combination, a frame, two cooperating mold sections, means for mounting one of the sections on a vertical pivot and for mounting the other section on a horizontal pivot on the frame, mechanism for simultaneously moving the sections about their respective pivots, whereby the molded article is simultaneously subjected to pressure in different directions sufficient to break it out of the mold.

2. A vulcanizing press comprising in combination, a frame, a lower mold section pivotally mounted on the frame for movement in a horizontal plane, the pivot being located near the outer marginal portion of the section, a second section pivotally mounted on the frame for swinging movement toward and away from the lower section, and mechanism for simultaneously moving the molds about their respective pivots.

3. A vulcanizing press comprising in combination, a frame, a mold section pivotally mounted on the frame for movement in a horizontal plane, a cooperating mold section pivotally mounted on the frame, a rotating driving shaft, means for operating the shaft, and mechanism driven by the shaft for simultaneously moving the mold sections in different directions.

4. In a vulcanizing press, the combination of a frame, a lower mold section guided for swinging horizontal movement and pivotally mounted on the frame, an upper mold section and means for pivotally supporting the upper section for swinging movement with respect to the frame, the last named means including a rock arm having a lost motion connection with the horizontal section.

5. A vulcanizing press comprising in combination a frame, a lower mold section pivotally mounted on the frame, means for moving said section in a horizontal plane, an upper mold section pivotally mounted on the frame, means for moving the upper section toward and away from the lower section, a rotating driving shaft journalled in the frame, means for rotating said shaft, a pinion mounted on the shaft, a rack meshing with the pinion, a link connecting the rack at one point to the upper section and other links movably connecting the rack to the upper section at a different point, whereby the molded article is subjected to pressure in different directions sufficient to break it out of the mold sections.

6. A vulcanizing press comprising in combination, a frame, two mold sections movably mounted thereon, means for moving one of the sections in its own plane about a vertical pivot, means for moving the other section on the frame for swinging movement about a horizontal pivot, a driving shaft, means for rotating the shaft, a pinion rigid with the shaft, a rack meshing with the pinion, two links pivotally connected to the rack at spaced points, one of the links being directly pivotally connected to the upper section, and the other link being connected through an intermediate link to the upper section, whereby the molded article is subjected to pressure in different directions sufficient to break it out of the mold sections.

7. A vulcanizing press comprising in combination, a frame, a lower mold section pivotally mounted on the frame for movement in a horizontal plane, an upper section pivotally mounted on the frame for swinging movement toward and away from the lower section, the pivotal connection for the upper section including a rock shaft and a bell crank having one arm thereof pivotally connected to the section and having the other arm pivotally connected to a link, a movable rack guided by the frame and pivotally connected to said link, a second link having a pivotal connection with the rack and with the upper section, a driving pinion meshing with the rack, means for actuating the pinion, and an operative connection between the rock shaft and the lower section.

WILLIAM J. CARTER.